United States Patent
Wang et al.

(10) Patent No.: US 7,091,289 B2
(45) Date of Patent: Aug. 15, 2006

(54) SOLID CATALYST COMPONENT FOR POLYMERIZATION OF ETHYLENE, PREPARATION THEREOF AND A CATALYST CONTAINING THE SAME

(75) Inventors: Zhiwu Wang, Beijing (CN); Zhong Tan, Beijing (CN); Tianyi Li, Beijing (CN); Xingbo Li, Beijing (CN); Kai Zhang, Beijing (CN); Peng Kou, Beijing (CN); Haixiang Cui, Beijing (CN); Zhengyang Guo, Beijing (CN); Liang Pan, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 24 days.

(21) Appl. No.: 10/455,256

(22) Filed: Jun. 5, 2003

(65) Prior Publication Data

US 2004/0030064 A1    Feb. 12, 2004

(30) Foreign Application Priority Data

Jun. 6, 2002    (CN)    ................................. 02120861

(51) Int. Cl.
  *C08F 4/646*    (2006.01)
  *C08F 4/654*    (2006.01)
  *C08F 4/642*    (2006.01)
(52) U.S. Cl. ................ 526/125.6; 502/104; 502/115; 502/121; 502/126; 502/132
(58) Field of Classification Search ............. 502/121, 502/126, 132, 133, 104, 115; 526/125.6
See application file for complete search history.

(56) References Cited

U.S. PATENT DOCUMENTS

| 4,302,565 | A | | 11/1981 | Goeke et al. | ................. | 526/88 |
| 4,379,759 | A | | 4/1983 | Goeke et al. | ............... | 252/429 |
| 4,784,983 | A | | 11/1988 | Mao et al. | .................. | 502/111 |
| 6,034,025 | A | * | 3/2000 | Yang et al. | ................. | 502/126 |
| 6,111,038 | A | | 8/2000 | Kioka et al. | ............. | 526/123.1 |
| 6,124,412 | A | * | 9/2000 | Bin-Taleb et al. | .......... | 526/159 |
| 6,569,964 | B1 | * | 5/2003 | Abu-Raqabah et al. | ..... | 526/153 |
| 2001/0039241 | A1 | * | 11/2001 | Job | ............................ | 502/104 |

FOREIGN PATENT DOCUMENTS

| CN | 1104220 | 6/1995 |
| CN | 1229092 | 9/1999 |
| CN | 1268521 | 10/2000 |
| EP | 0 395 083 | 10/1990 |
| EP | 0 499 093 | 8/1992 |
| EP | 1 083 187 | 3/2001 |

* cited by examiner

*Primary Examiner*—Caixia Lu
(74) *Attorney, Agent, or Firm*—Ladas and Parry LLP

(57) ABSTRACT

The present invention provides a catalyst component used for homopolymerization or co-polymerization of ethylene, comprising at least one suitable electron donor compound supported on a composition containing magnesium and titanium, wherein the electron donor compound is selected from the group consisting of aliphatic ethers, alicyclic ethers, aromatic ethers, aliphatic ketones and alicyclic ketones, and wherein the composition containing magnesium and titanium is prepared by dissolving a magnesium compound into a solvent system to form a homogeneous solution and then contacting the solution with a titanium compound in the presence of a precipitation aid to precipitate the composition. The present invention also relates to a method for the preparation of said catalyst component and a catalyst comprising thereof, and to use of the catalyst in homopolymerization of ethylene or co-polymerization of ethylene with at least one $C_3$–$C_8$ α-olefin.

23 Claims, No Drawings

US 7,091,289 B2

SOLID CATALYST COMPONENT FOR POLYMERIZATION OF ETHYLENE, PREPARATION THEREOF AND A CATALYST CONTAINING THE SAME

CROSS REFERENCE OF RELATED APPLICATION

The present application claims priority CN 02120861.1, filed on Jun. 6, 2002, which is incorporated herein by reference in its entirety and for all purposes.

TECHNICAL FIELD

The present invention relates to a solid catalyst component used for polymerization of olefin, in particular, ethylene, its preparation, to a catalyst comprising the same and its use.

BACKGROUND

It is well known that catalyst component with magnesium, titanium, halogen and electron donor as main ingredients can be widely used in the polymerization of olefins, especially in the polymerization of ethylene or co-polymerization of ethylene and alpha-olefin(s). When such a catalyst component is used in fluid bed gas phase polymerization process, the catalyst component is typically supported on a carrier, such as silica and the like, in order to ensure the morphology and particle size distribution of the catalyst particles to be suitable for the operation of fluidized state. For example, the catalysts for fluid bed gas phase process disclosed in U.S. Pat. No. 4,302,565, U.S. Pat. No. 4,379,759 and CN 1064870A(corresponding to EP0499093) are prepared by impregnating a mother component formed from a titanium compound, a magnesium compound and an electron donor compound onto a carrier, such as silica and the like, and treating the impregnated mother component with an activating compound. The silica used in U.S. Pat. No. 4,302,565 and U.S. Pat. No. 4,379,759 have an average particle size of from 50 to 150 microns, a surface area greater than 50 $m^2/g$, and an average pore size greater than 80 angstroms.

In the above mentioned patents, in order that the catalyst is suitable for fluid bed gas phase process for polymerizing ethylene, there is relatively strict requirement in average particle size, surface area and pore size of the carrier, i.e. silica used. In addition, the carrier material is expensive, and the silica carrier needs to be activated strictly prior to use. Thus the cost of the catalyst is high. Furthermore, since the catalyst active component is supported on carrier by a process such as impregnation and the like, the catalyst efficiency is not satisfactory. Further, the fine powder content of the polyethylene powder produced using said catalyst is relatively larger so that the particles having a particle size less than 150 microns comprise typically about 15 percent by weight of the whole powder, and this is very undesired in commercial production. When the catalyst is used in a plant for gas phase fluid bed ethylene polymerization, it is usually fed in the form of solid so that the stability in the feeding step is poor and phenomena such as blockage and bridge formation in pipelines are easy to occur.

Chinese patent CN 85100997(corresponding to U.S. Pat. No. 4,784,983) disclosed a catalyst for olefin polymerization, which was prepared by dissolving a magnesium halide into an organic epoxy compound and an organophosphorus compound to form a homogeneous solution and reacting the solution with at least one precipitation aid, a polycarboxylic ester electron donor and titanium halide or derivative thereof. The catalyst exhibits high polymerization activity and good stereoregularity when it is used in propylene polymerization. However, when it is used in ethylene polymerization, the catalyst exhibits low polymerization activity, broad distribution of particle size of polymer and poor hydrogen response.

On the basis of above mentioned Chinese patent CN 85100997, EP 1083187A1 disclosed a catalyst for ethylene homopolymerization or co-polymerization, which was prepared by dissolving a magnesium halide into an organic epoxy compound and an organophosphorus compound, adding an electron donor activator thereto to form a homogeneous solution, and reacting the solution with at least one precipitation aid and titanium halide or derivative thereof. The catalyst exhibits relatively high polymerization activity and the polymer obtained is good in particle morphology and high in bulk density, when the catalyst is used in slurry polymerization of ethylene. However, when the catalyst component comprising alcohol type of activator is used in gas phase process of ethylene polymerization, especially in fluid bed process of ethylene polymerization, the results are not satisfactory. The rate of the polymerization reaction is relatively quick, especially in the initial stage, so that the polymer particles produced are fragile and the polymer particles are relatively fine. In general, the polymer particles having a particle size of from 70 to 150 microns comprise from 50 to 60 percent by weight of the whole powder. In addition, the morphology of the polymer particles and the flowability of the polymer powder are poor.

Therefore, there exists a strong need for providing a high efficient solid catalyst component, which is capable of producing polymer having low content of fine powder, has relatively narrow distribution of particle size and appropriate average particle size, is high in catalytic activity, and is very suitable for ethylene slurry or gas phase polymerization, especially for fluid bed gas phase process of ethylene polymerization in which catalyst is fed in the form of slurry.

It has been found that a catalyst component, which has appropriate average particle size, relatively narrow distribution of particle size, good particle morphology, particles of which are not easy to break during polymerization reaction, and which therefore is very suitable for ethylene homopolymerization or co-polymerization, especially for gas phase process of ethylene polymerization, can be obtained by supporting a suitable electron donor and optionally a titanium compound onto a composition comprising magnesium and titanium as carrier component, or by supporting a suitable electron donor and a titanium compound onto a magnesium compound-containing composition, and optionally treating the product containing magnesium, titanium and electron donor with an activator, without using silica and the like as carrier. Since the catalytic activity of the catalyst according to the present invention is also improved greatly, it is possible to dilute the catalyst with a inert diluent and achieve homogeneous feeding in liquid state by means of pumping, thereby overcoming the problems encountered in the above catalyst feeding step.

SUMMARY OF THE INVENTION

One object of the present invention is to provide a catalyst component used for homopolymerization or co-polymerization of ethylene, comprising at least one electron donor compound supported on a composition containing magnesium and titanium, wherein the electron donor compound is selected from the group consisting of aliphatic ethers, cyclic ethers, aromatic ethers, aliphatic ketones and alicyclic ketones, and wherein the composition containing magnesium and titanium is prepared by dissolving a magnesium compound into a solvent system to form a homogeneous solution and then contacting the solution with a titanium compound in the presence of a precipitation aid to precipitate the composition.

Another object of the present invention is to provide a catalyst component used for homopolymerization or co-polymerization of ethylene, comprising at least one electron donor compound and at least one titanium compound supported on a magnesium compound-containing composition, wherein the electron donor compound is selected from the group consisting of aliphatic ethers, cyclic ethers, aromatic ethers, aliphatic ketones and alicyclic ketones.

A further object of the present invention is to provide a method for the preparation of a catalyst component used for homopolymerization or co-polymerization of ethylene, comprising the steps of:

dissolving a magnesium compound into a solvent system containing an organic epoxy compound and an organophosphorus compound to form a homogeneous solution;

contacting the solution with a titanium compound in the presence of a precipitation aid to precipitate a solid;

treating the obtained solid with an electron donor compound and, optionally, the titanium compound to obtain a product; and optionally, activating the resultant product with an activator.

A still further object of the present invention is to provide a catalyst for homopolymerization or co-polymerization of ethylene, comprising the reaction product of the following two components:

(a) catalyst component as defined above; and (b) organoaluminum as cocatalyst component.

A yet still object of the present invention is to provide a use of the catalyst of the present invention in polymerization of ethylene or co-polymerization of ethylene with at least one $C_3$–$C_8$ α-olefin. In a preferred embodiment, the present invention provides a use of the catalyst according to the present invention in homopolymerization or co-polymerization of ethylene in gas phase process or slurry process.

A yet still object of the present invention is to provide a method for homopolymerization of ethylene or co-polymerization of ethylene with at least one $C_3$–$C_8$ α-olefin, comprising contacting ethylene or ethylene and at least one $C_3$–$C_8$ α-olefin with the catalyst of the present invention under polymerization conditions. In a preferred embodiment, the present invention provides a method for homopolymerization of ethylene or co-polymerization of ethylene with at least one $C_3$–$C_8$ α-olefin, comprising contacting ethylene or ethylene and at least one $C_3$–$C_8$ α-olefin with the catalyst of the present invention under polymerization conditions in slurry or gas phase process.

DETAILED DESCRIPTION OF THE PRESENT INVENTION

In one aspect, the present invention provides a catalyst component used for homopolymerization or co-polymerization of ethylene, comprising at least one suitable electron donor compound supported on a composition containing magnesium and titanium.

The composition containing magnesium and titanium can broadly utilize a large number of Ziegler—Natta catalyst components containing magnesium and titanium well known by those skilled in the art. Of them the preferred are those prepared by dissolving a magnesium compound into a solvent system to form a homogeneous solution and then contacting the solution with a titanium compound and, optionally, a suitable precipitation aid to precipitate a composition containing magnesium and titanium.

The magnesium compound can be selected from the group consisting of magnesium dihalides, hydrates or alcohol adducts of magnesium dihalide, derivatives formed by replacing one halogen atom of magnesium dihalide with hydrocarbyloxy group or halo-hydrocarbyloxy group, or their mixture.

Said solvent system can comprise any of a large number of electron donor compounds which have been disclosed by prior art and are capable of dissolve magnesium compounds, such as, for example organic alcohols, carboxylic acids, aldehydes, amines, transition metal alkoxides and the like. Such electron donor compounds capable of converting solid magnesium compounds into solution are disclosed in, for example, U.S. Pat. No. 6,111,038, which is incorporated herein by reference.

Preferably, said solvent system comprises an organic epoxy compound and an organophosphorus compound, and if appropriate, it further comprises an alkane or an arene as diluent. Thus, in a preferred embodiment of the present invention, the composition containing magnesium and titanium can be prepared by dissolving a magnesium compound into a solvent system containing an organic epoxy compound and an organophosphorus compound to form a homogeneous solution, and contacting then the solution with a titanium halide or derivative thereof in the presence of a precipitation aid to precipitate a solid. The preparation method is disclosed in details in Chinese Patent CN85100997 (corresponding to U.S. Pat. No. 4,784,983), which is incorporated herein by reference. It is possible to incorporate an activity promoter, such as, alcohols, ethers, etc. into the magnesium-containing solution prior to contacting the solution with the titanium halide or derivative thereof, and reference can be made to EP 1083187A1, which is incorporated herein by reference, for related content.

In another preferred embodiment of the present invention, the composition containing magnesium and titanium can be prepared by dissolving a magnesium compound into a solvent system containing an branched aliphatic alcohol to form a homogeneous solution, and contacting then the solution with a titanium halide or derivative thereof in the presence of a precipitation aid to precipitate a solid.

The organic epoxy compound useful in the present invention can be at least one selected from the group consisting of oxides of aliphatic olefin, diene or halogenated aliphatic olefin or diene, glycidyl ethers and cyclic ethers, having from 2 to 8 carbon atoms. Examples thereof comprise, but are not limited to, ethylene oxide, propylene oxide, butylene oxide, butadiene oxide, butadiene dioxide, epichlorohydrin, glycidyl methyl ether, and diglycidyl ether.

The organophosphorus compound useful in the present invention can be at least one selected from the group consisting of hydrocarbyl esters or halohydrocarbyl esters of ortho-phosphoric acid or phosphorous acid. Examples thereof comprise, but are not limited to, trimethyl phosphate, triethyl phosphate, tributyl phosphate, triphenyl phosphate, trimethyl phosphite, triethyl phosphate, tributyl phosphite, and triphenyl phosphite, One example of the suitable branched aliphatic alcohol is 2-ethylhexanol.

In general, the solvent system further comprises inert hydrocarbon diluent, including, but not limited to, aromatic hydrocarbon, for example benzene, toluene, xylene and ethylbenzene; aliphatic hydrocarbon, for example heptane, octane, nonane, decane, kerosene, solvent oil and white oil.

The precipitation aids useful in the present invention can be selected from the group consisting of organic acids, organic acid anhydrides, ethers, ketones, and mixture thereof. Examples thereof comprise, but are not limited to, acetic anhydride, phthalic anhydride, succinic anhydride, maleic anhydride, 1,2,4,5-benzene tetracarboxylic acid dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether and dipentyl ether.

One main characteristic of the catalyst component of the present invention is to support further at least one of suitable electron donors and, optionally, a titanium halide or derivative thereof onto, for example, the composition containing magnesium and titanium.

The electron donor compounds useful in the present invention can be selected from the group consisting of aliphatic ethers, alicyclic ethers, aromatic ethers, aliphatic ketones and alicyclic ketones. Preferably, the electron donor compounds can be selected from the group consisting of aliphatic ethers having total from 2 to 12 carbon atoms, cyclic ethers having from 3 to 5 carbon atoms, aromatic ethers having total from 7 to 8 carbon atoms, saturated or unsaturated aliphatic ketones having from 3 to 6 carbon atoms, alicyclic ketones having from 5 to 10 carbon atoms. Examples thereof comprise, but are not limited to, diethyl ether, di-n-butyl ether, dihexyl ether, ethyl phenyl ether, tetrahydrofuran (THF), acetone, butanone, isobutyl methyl ketone, 4-methyl-3-penten-2-one, hexadione, and cyclohexanone. These electron donors can be used alone or in a combination.

The titanium compounds useful in the present invention can preferably have a general formula $Ti(OR)_aX_b$, in which R is $C_1\sim C_{14}$ aliphatic hydrocarbyl or aromatic hydrocarbyl, X is halogen, a is 0, 1 or 2, b is an integer of from 1 to 4, and the sum of a+b is 3 or 4. Specifically, the titanium compound used can be one or more selected from the group consisting of titanium tetrachloride, titanium tetrabromide, titanium tetraiodide, tetrabutyl titanate, tetraethyl titanate, titanium monochloride triethoxide, titanium dichloride diethoxide, titanium trichloride monoethoxide, and titanium trichloride, preferably titanium tetrachloride, titanium trichloride monoethoxide, and titanium trichloride.

In another aspect, the present invention provides a catalyst component used for homopolymerization or co-polymerization of ethylene, comprising at least one suitable electron donor compound and at least one titanium compound supported on a magnesium compound-containing composition, wherein the electron donor compound is selected from the group consisting of aliphatic ethers, cyclic ethers, aromatic ethers, aliphatic ketones and alicyclic ketones. The electron donor compounds and titanium compounds used are those described above. The magnesium compound-containing composition can be, for example, so-called "spherical carrier" well known in the art, which is a complex of magnesium dichloride and ethanol, Reference can be made to EP395083, which is incorporated herein by reference, for details of the method for the preparation of the spherical carrier.

The catalyst component of the present invention can be treated with at least one activator based on the requirement to the catalyst activity during the actual application.

The activators that can be used have a general formula $AlR'_cX'_dH_e$, in which R' is saturated hydrocarbyl having 1 to 14 carbon atoms, X' is a halogen, d is 1 or 2, e is 0 or 1, and the sum of c+d+e is 3. Examples of the activators include, but are not limited to, $AlEt_3$, $Al(n-C_6H_{13})_3$, $Al(n-Bu)_3$, $Al(i-Bu)_3$, $AlEt_2Cl$, $Al(n-C_8H_{17})_3$ $AlEt_2H$.

In a preferred embodiment, the present invention provides a method for the preparation of a catalyst component used for homopolymerization or co-polymerization of ethylene, comprising the steps of:

(i) preparing a composition containing magnesium and titanium by dissolving a magnesium compound into a solvent system containing an organic epoxy compound and an organophosphorus compound to form a homogeneous solution, and then contacting the solution with a titanium compound in the presence of a precipitation aid to precipitate a solid, wherein individual raw material can be used in the amount of from 0.2 to 10 mole for the organic epoxy compound, from 0.1 to 3 mole for the organophosphorus compound, from 0.03 to 1.0 mole for the precipitation aid, from 0.5 to 120 mole for the titanium compound, based on per mole magnesium compound;

(ii) treating the solid obtained in step (i) with an electron donor compound and, optionally, the titanium compound, wherein individual raw material can be used in the amount of from 0 to 30 mole, preferably from 0.5 to 10 mole for the titanium compound, from 0.01 to 10 mole, preferably from 0.05 to 1 mole for the electron donor compound, based on per mole magnesium compound; and (iii) optionally, activating the treated product obtained in step (ii) with an activator having a general formula $AlR'_cX'_dH_e$, in which R' is saturated hydrocarbyl having 1 to 14 carbon atoms, X' is a halogen, d is 1 or 2, e is 0 or 1, and the sum of c+d+e is 3, wherein the activator can be used in the amount of from 0.1 to 10 mole, based on per mole magnesium compound.

In the method described above, preferably the titanium compound used has a general formula $Ti(OR)_aX_b$, in which R is $C_1\sim C_{14}$ aromatic hydrocarbyl or aromatic hydrocarbyl, X is halogen, a is 0, 1 or 2, b is an integer of from 1 to 4, and the sum of a+b is 3 or 4, and examples thereof are listed hereinbefore.

Generally, the catalyst component of the present invention comprises from 5 to 30 percent by weight of magnesium, from 0.1 to 10 percent by weight of titanium, from 15 to 65 percent by weight of halogen, and from 1 to 60 percent by weight of electron donor, based on the total weight of the catalyst component.

The average particle size of the catalyst component of the present invention, expressed as D50 value, is typically from 5 to 35 microns, preferably from 10 to 25 microns.

The present invention also relates to a catalyst for homopolymerization or co-polymerization of ethylene, comprising the reaction product of catalyst component described above and organoaluminum as cocatalyst component. The organoaluminum compounds used in the polymerization of olefins as cocatalyst are well known in the art. In one embodiment, the organoaluminum compound used is alkylaluminium compounds having a formula of $AlR''_3$, in which R'', which may be identical with or different from one another, represent alkyl having 1 to 8 carbon atoms or chlorine with the proviso that R'' are not chlorine simultaneously. The alkylaluminium compounds can be used alone or in a combination, and are preferably $AlEt_3$, $Al(i-Pro)_3$, $Al(n-Bu)_3$, $Al(i-Bu)_3$, $Al(n-C_6H_{13})_3$, $Al(n-C_8H_{17})_3$, $AlEt_2Cl$.

The ratio of the catalyst component to the organoaluminum compound can be from 1:5 to 1:100, preferably from 1:8 to 1:30, counted on the molar ratio of titanium: aluminum.

The catalysts of the invention are suitable for use in homo-polymerization of ethylene and co-polymerization of ethylene with other alpha-olefin(s). The alpha-olefin can be one or more selected from the group consisting of propylene, 1-butene, 1-pentene, 1-hexene, 1-octene and 4-methyl-1-pentene. Polymerization process can employ gas phase, slurry or solution process, preferably gas phase fluid bed process, in particular, gas phase fluid bed process operated in condensing technology. Since the catalytic activity of the catalyst according to the present invention is very high, it is possible to dilute the catalyst with an inert diluent, such as mineral oil, and achieve homogeneous catalyst feeding in slurry form by means of pumping so that the operation is stable.

EMBODIMENTS OF THE INVENTION

The following examples further describe the invention, but do not make limitation to the invention in any way. Unless indicated otherwise, all operations were carried out under nitrogen atmosphere.

Testing Methods:
1. Melt index (MI): measured according to ASTM D1238-99, at 190° C., under 2.16 kg loading.
2. Flow index (FI): measured according to ASTM D1238-99, at 190° C., under 21.6 kg loading.
3. Melt-Flow Ratio (MFR): the ratio of Melt index to Flow index measured according to above procedure.
4. Density of the polymer: measured according to ASTM D1505-98.
5. Distribution of the particle size: measured using a Malvern Instr. 2600, available from Malvern Company, England, according to a method based on the diffraction of monochromatic laser.

EXAMPLE 1

1. Preparation of the Catalyst Component

To a reactor which was completely purged with $N_2$ were added successively 4.8 g of anhydrous magnesium chloride, 93 ml of toluene, 4.0 ml of epichlorohydrin, and 12.5 ml of tributyl phosphate. With sing at 450 rpm, the mixture was heated to 60° C. and held at the temperature for 2 hours for reaction, then 1.4 g of phthalic anhydride was added thereto and the reaction mixture was held at that temperature for further one hour for reaction. The reaction mixture was cooled to −28° C. and 56 ml $TiCl_4$ was added dropwise thereto over one hour, then the temperature was increased slowly to 85° C. over 4 hours and maintained for flier one hour. Solid was precipitated gradually during the heating. After removing the mother liquid by filtration, the filter cake was washed with toluene and hexane individually twice and then dried to give solid A containing magnesium and titanium.

To another reactor completely purged with $N_2$ were added successively 10 g of solid A, 90 ml of isopentane, 0.3 g of titanium trichloride and 30 ml of tetrahydrofuran. The mixture was allowed to react for one hour at room temperature. After removing the mother liquid by filtration, to the filter cake were added 90 ml of isopentane and 3.5 ml of 26.43 percent by volume solution of monochlorodiethylaluminium in isopentane, and the mixture was allowed to react for one hour at room temperature, then dried by evaporation to give 11.5 g of particulate solid component B. Solid component B was found to contain 1.43 percent by weight of titanium, 12.8 percent by weight of magnesium, and 49.1 percent by weight of tetrahydrofuran.

2. Slurry Polymerization of Ethylene

With stirring, to a 2 liters stainless steel autoclave, which had been well evacuated and replaced with hydrogen, were added about 0.5 liter of hexane by means of nitrogen pressure, 2 ml of 1 mmol/ml solution of $AlEt_3$ in hexane using a syringe and about 30 mg of the above solid component B. Then to the reactor was supplemented hexane to 1 liter of total amount. Upon completion, the reactor was heated to 85° C., introduced hydrogen to make the fractional pressure of hydrogen in the autoclave be 0.28 MPa, then introduced ethylene gas to make its fractional pressure be 0.75 MPa. The polymerization reaction was continued for 2 hours at constant temperature of 85° C. and ethylene was made up during the polymerization to maintain the fractional pressure of ethylene. Then the temperature of the autoclave was reduced, the pressure was relieved and the polymer slurry was discharged. After removing hexane, the polymer was dried in air under an infrared lamp to give polyethylene powder. The results of ethylene polymerization were listed in Table 1. The particle sizes of the polymer obtained and the catalyst component B were respectively determined, and the results were listed in Tables 2 and 3.

EXAMPLE 2

To a reactor completely purged with $N_2$ were added successively 10 g of solid A obtained in example 1 and 90 ml of isopentane. 0.7 ml of titanium tetrachloride and 5 ml of tetrahydrofuran were added dropwise at room temperature, and the mixture was allowed to react for one hour at room temperature. To the reaction mixture was further added 2 ml of 26.43 percent by volume solution of monochlorodiethylaluminium in isopentane, and the mixture was allowed to react for one hour at room temperature, then dried by evaporation to give 11.3 g of solid component 13, which was found to contain 2.90 percent by weight of titanium, 12.0 percent by weight of magnesium, and 20.6 percent by weight of tetrahydrofuran.

The catalyst component was evaluated and the polymerization procedure and conditions were same as that described in example 1. The results were showed in Table 1.

EXAMPLE 3

To a reactor completely purged with $N_2$ were added successively 10 g of solid A obtained in example 1, 60 ml of toluene and 40 ml of titanium tetrachloride. 8.3 ml of tetrahydrofuran was added dropwise at room temperature, and the mixture was heated to 120° C. and held at that temperature to react for one hour. After removing the mother liquid by filtration, the filter cake was washed with hexane thrice and then dried under vacuum to give 10.6 g of solid component B, which was found to contain 3.61 percent by weight of titanium, 13.5 percent by weight of magnesium, and 24.1 percent by weight of tetrahydrofuran.

The catalyst component was evaluated and the polymerization procedure and conditions were same as that described in example 1. The results were showed in Table 1.

EXAMPLE 4

To a reactor which was completely purged with $N_2$ were added successively 4.8 g of anhydrous magnesium chloride, 92 ml of toluene, 4.0 ml of epichlorohydrin, and 12.5 ml of tributyl phosphate. With stirring at 450 rpm, the mixture was heated to 60° C. and held at the temperature for 2 hours for reaction, then 1.4 g of phthalic anhydride was added thereto and the reaction was continued for further one hour. The reaction mixture was cooled to −28° C. and 56 ml of $TiCl_4$ was added dropwise thereto over one hour, then the temperature was increased slowly to 85° C. over 4 hours and maintained for further one hour for reaction. Solid was precipitated gradually during the heating. After removing the mother liquid by suction filtration, the filter cake was washed with hexane twice to give solid A containing magnesium and titanium. To the reactor containing the solid A was added 60 ml of hexane, and 2.4 ml of tetrahydrofuran was added with stirring. The mixture was allowed to react at room temperature for one hour, then washed twice with hexane and dried under vacuum to give 6.72 g of particulate solid component B. The solid component B was found to contain 2.54 percent by weight of titanium, 17.3 percent by weight of magnesium, and 16.9 percent by weight of tetrahydrofuran.

The catalyst component was evaluated and the polymerization procedure and conditions were same as that described in example 1. The results were showed in Table 1.

EXAMPLE 5

To a reactor which was completely purged with $N_2$ were added successively 4.8 g of anhydrous magnesium chloride, 92 ml of toluene, 4.0 ml of epichlorohydrin, and 12.5 ml of tributyl phosphate. With stirring at 450 rpm, the mixture was heated to 60° C. and held at the temperature for 2 hours for reaction, then 1.4 g of phthalic anhydride was added thereto and the reaction was continued for further one hour. The reaction mixture was cooled to −28° C. and 56 ml of $TiCl_4$ was added dropwise thereto over one hour, then the temperature was increased slowly to 85° C. over 4 hours and maintained for further one hour for reaction. Solid was precipitated gradually during the heating. After removing the mother liquid by suction filtration, the filter cake was washed with hexane twice to give solid A containing magnesium and titanium. To the reactor containing the solid A was added 90 ml of hexane, and 10 ml of titanium tetrachloride was added with stirring. The mixture was allowed to react at 60° C. for 0.5 hour. After suction filtering, to the residue was added 60 ml of hexane, and 1.5 ml of tetrahydrofuran was added with stirring. The mixture was allowed to react at room temperature for one hour, then washed twice with hexane and dried under vacuum to give 7.68 g of particulate solid component B. The solid component B was found to contain 8.32 percent by weight of titanium, 17.9 percent by weight of magnesium, and 10.2 percent by weight of tetrahydrofuran.

The catalyst component was evaluated and the polymerization procedure and conditions were same as that described in example 1. The results were showed in Table 1.

EXAMPLE 6

To a reactor which was completely purged with $N_2$ were added successively 4.8 g of anhydrous magnesium chloride, 93 ml of toluene, 4.0 ml of epichlorohydrin, and 12.5 ml of tributyl phosphate. With stirring at 450 rpm, the mixture was heated to 60° C. and held at the temperature for 2 hours, then 1.4 g of phthalic anhydride was added thereto and the reaction mixture was held at that temperature for further one hour The reaction mixture was cooled to −28° C. and 56 ml of $TiCl_4$ was added dropwise thereto over one hour while maintaining constant temperature, then the temperature was increased slowly to 85° C. over 4 hours and maintained for further one hour. Solid was precipitated gradually during the heating. After removing the mother liquid by filtration, the filter cake was washed twice with hexane and sucking filtered to give solid A containing magnesium and titanium.

To the reactor containing above solid A was added 60 ml of hexane, then 1.5 ml of tetrahydrofuran was added dropwise with stirring, and the mixture was allowed to react for one hour at room temperature. After suction filtration, the solid residue was washed twice with hexane, then to the reactor was added 60 ml of hexane, and the temperature was cooled to −10° C. Then, 1.5 ml of 26.43 percent by volume solution of monochlorodiethylaluminium in hexane was added slowly to the reactor while maintaining constant temperature. The mixture was slowly warmed to room temperature, followed by suction filtration and washing twice with hexane. Drying under vacuum gave 7.58 g of particulate solid component B, which was found to contain 2.30 percent by weight of titanium, 17.6 percent by weight of magnesium, and 12.2 percent by weight of tetrahydrofuran.

The catalyst component was evaluated and the polymerization procedure and conditions were same as that described in example 1. The results were showed in Table 1.

COMPARATIVE EXAMPLE 1

A catalyst component was prepared according to the procedure disclosed in U.S. Pat. No. 4,302,565 and U.S. Pat. No. 4,379,759.

Activating silica: 948 grade spherical silica, available from Grace Davison, US, was activated at 600° C. for 4 hours.

Under nitrogen atmosphere, to a reactor were added 100 ml THF, 0.74 g of titanium trichloride and 1.13 g of anhydrous magnesium chloride. The mixture was heated to 70° C. and allowed to react for 1 hour to give a mother stock ready for use. To another reactor were added 60 ml of isopentane, 10 g of the above activated silica and 4.3 ml of triethyl aluminum. The mixture was allowed to react at room temperature for 30 minutes. Then the isopentane in the reactor was evaporated at 55° C. to such an extent that the content of aluminum in the material contained in the reactor was 1.65 wt %. Thereafter, the mother stock prepared above was transferred to the reactor, and the temperature was increased so that reflux occurred. After maintaining constant temperature for 1 hour, the THF in the reactor was evaporated to such an extent that the content of THF in the material contained in the reactor was 12.6 wt %. Then 86 ml of isopentane and 5.3 ml of monochlorodiethylaluminium were added thereto, and the reaction was continued at room temperature for 30 minutes. Next, 3.3 ml of tri-n-hexylaluminium was added thereto, and the reaction was continued at room temperature for 30 minutes. Particulate solid was obtained by drying under vacuum. The final catalyst component was found to contain 0.78 percent by weight of titanium, 1.58 percent by weight of magnesium, and 10.9 percent by weight of tetrahydrofuran.

The catalyst component was evaluated and the polymerization procedure and conditions were same as that described in example 1. The results were showed in Table 1.

COMPARATIVE EXAMPLE 2

A catalyst component was prepared according to the procedure disclosed in EP 1083187A1.

To a reactor which was completely replaced with high pure $N_2$ were added successively 4 g of anhydrous magnesium chloride, 60 ml of toluene, 2.2 ml of epichlorohydrin, 4.6 ml of tributyl phosphate and 1.0 ml of ethanol. The mixture was heated to 80° C. with stirring and held at the temperature for 15 minutes to dissolve the solid completely thereby giving a homogeneous solution. Then 1.1 g of phthalic anhydride was added thereto and the temperature was maintained for further one hour. The solution was cooled to −25° C. and added dropwise 0.5 mol of $TiCl_4$. Then the temperature was increased slowly to 80° C. and maintained for 3 hours for reaction. After filtration, the cake was washed with toluene for six times and then hexane for six times, and dried under vacuum to give a solid catalyst component.

The catalyst component was evaluated and the polymerization procedure and conditions were same as that described in example 1. The results were showed in Table 1. The particle sizes of the polymer obtained and the catalyst component were respectively determined, and the results were listed in Tables 2 and 3.

TABLE 1

The results of polymerization for examples and comparative examples

| Ex. No. | Activity (gPE/gcat) | Bulk Density (g/cm³) | Content of fine powder less than 150 μm (Wt %) | MI (g/10 min) |
|---|---|---|---|---|
| Example 1 | 6677 | 0.350 | 5.2 | 2.02 |
| Example 2 | 11196 | 0.353 | 10.8 | 0.56 |
| Example 3 | 8060 | 0.417 | 10.7 | 0.22 |
| Example 4 | 7547 | 0.343 | 0.7 | 0.91 |
| Example 5 | 9863 | 0.328 | 1.6 | 0.60 |
| Example 6 | 9750 | 0.45 | 1.4 | 1.3 |
| Comparative Example 1 | 840 | 0.36 | 14.7 | 0.48 |
| Comparative Example 2 | 30700 | 0.37 | 54.6 | 0.51 |

TABLE 2

Comparison of the distribution of particle size of the polymer between example 1 and comparative example 2

| | >800 μm | 800~350 μm | 350~150 μm | 150~75 μm | <75 μm |
|---|---|---|---|---|---|
| Example 1 | 8.6 | 57.8 | 28.4 | 4.1 | 1.1 |
| Comparative Example 2 | 8.0 | 11.0 | 26.4 | 44.6 | 10.0 |

TABLE 3

Comparison of the distribution of particle size of the catalyst component between example 1 and comparative example 2

| | d10, μm | d50, μm | d90, μm |
|---|---|---|---|
| Example 1 | 3.443 | 19.23 | 31.032 |
| Comparative Example 2 | 2.549 | 7.682 | 15.019 |

EXAMPLE 7

A slurry mixture with a catalyst component concentration of 1 mgTi/ml was prepared by mixing 1 g of solid catalyst component B obtained in example 3 with white oil, tri-n-hexyl aluminum and monochlorodiethylaluminium, wherein tri-n-hexyl aluminum and monochlorodiethylaluminium were used in such amount that the molar ratio of tri-n-hexyl aluminum to tetrahydrofuran was equal to 0.2 and the molar ratio of monochlorodiethylaluminium to tetrahydrofuran was equal to 0.5.

Gas Phase Co-Polymerization of Ethylene and 1-Butene

Co-polymerization of ethylene and 1-butene was carried out using the slurry mixture prepared above and cocatalyst, i.e. triethyl aluminum. The co-polymerization experiment was performed in a fluid bed pilot plant of ϕ 150 mm operated in batch mode. The conditions for copolymerization and some results were as follows:

Polymerization Temperature: 88° C.
Amount of Catalyst: 1 ml of the above slurry mixture
Amount and type of Cocatalyst: 2.5 g, triethyl aluminum
Total Pressure: 1700 kPa
Molar Ratio of 1-Butene to Ethylene: 0.146
Molar Ratio of Hydrogen to Ethylene: 0.149
Reaction Time: 3.0 hours
Flow Rate of the Gases: 0.28 m/sec
Density of the Polymer: 0.922
Melt Index of the Polymer: 0.75 g/10 mins
Flow Index of the Polymer: 22.2 g/10 mins
MFR of the Polymer: 29.6
Yield of Polymer: 6999 gPE/gCat.
Bulk Density of the Polymer Powder: 0.31 g/cm³

EXAMPLE 8

1. Preparation of the Catalyst Component

To a reactor which was completely purged with $N_2$ were added successively 6.5 kg of anhydrous magnesium chloride, 124.6 liters of toluene, 5.4 liters of epichlorohydrin, and 16.9 liters of tributyl phosphate. With stirring at 130 rpm, the mixture was heated to 60° C. and held at the temperature for 3.5 hours, then 1.89 kg of phthalic anhydride was added thereto and the reaction mixture was held at that temperature for flier one hour. The reaction mixture was cooled to −28° C. and 75.8 liters of $TiCl_4$ was added dropwise thereto, then the temperature was increased slowly to 80° C. over 4 hours and maintained for further one hour. Solid was precipitated gradually during the heating. After removing the mother liquid by filtration, the filter cake was washed with toluene and hexane individually thrice and then dried to give solid A containing magnesium and titanium.

To a dissolving reactor were added 2 liters of tetrabutyl titanate and 6.8 liters of THF. After homogenizing by stirring, 680 grams of titanium trichloride was added and dissolved with a stirring speed of 200 rpm to give a titanium compound-containing solution.

The above prepared solid A was transferred to another reactor completely purged with $N_2$, and 100 liters of hexane was added thereto. With stirring at 130 rpm, 8.26 liters of titanium compound-containing solution prepared above was added drowse at 10° C. The mixture was allowed to react for one hour at room temperature. After removing the mother liquid by filtration and washing the solid residue twice with hexane, 80 liters of hexane and 4.4 liters of 14 percent by volume solution of monochlorodiethylaluminium in hexane were added thereto, and the mixture was allowed to react for one hour, then dried under vacuum to give 16.0 kilograms of particulate solid component B. Solid component B was found to contain 3.13 percent by weight of titanium, 17.1 percent by weight of magnesium, 0.73 percent by weight of aluminum, and 30.2 percent by weight of tetrahydrofuran.

2. Slurry Polymerization

The catalyst component was evaluated and the polymerization procedure and conditions were same as that described in example 1. The results were showed in Table 4.

3. Gas Phase Co-Polymerization of Ethylene and 1-Butene

A slurry mixture with a catalyst component concentration of 1 mgTi/ml was prepared by mixing 1 g of solid catalyst component B prepared above with white oil, tri-n-hexyl aluminum and monochlorodiethylaluminium, wherein tri-n-hexyl aluminum and monochlorodiethylaluminium were used in such amount that the molar ratio of tri-n-hexyl aluminum to tetrahydrofuran was equal to 0.2 and the molar ratio of monochlorodiethylaluminium to tetrahydrofuran was equal to 0.5.

Co-polymerization of ethylene and 1-butene was carried out using the slurry mixture prepared above and cocatalyst, i.e. triethyl aluminum. The co-polymerization experiment was performed in a fluid bed pilot plant of φ 150 mm operated in batch mode. The conditions for copolymerization and some results were as follows:

Polymerization Temperature: 88° C.
Amount of Catalyst: 1 ml of the above slurry mixture
Amount and type of Cocatalyst: 2.5 g, triethyl aluminum
Total Pressure: 1700 kPa
Molar Ratio of 1-Butene to Ethylene: 0.31
Molar Ratio of Hydrogen to Ethylene: 0.12
Reaction Time: 3.0 hours
Flow Rate of the Gases: 0.28 m/sec
Density of the Polymer: 0.919 g/cm$^3$
Melt Index: 1.84 g/10 min
MFR: 30.2
Yield: 14100 gPE/gCat.
Bulk Density of the Polymer Powder: 0.32 g/cm$^3$

EXAMPLE 9

1. Preparation of the Catalyst Component

To a reactor which was completely purged with $N_2$ were added successively 4.8 g of anhydrous magnesium chloride, 93 ml of toluene, 4.0 ml of epichlorohydrin, and 12.5 ml of tributyl phosphate. With stirring at 450 rpm, the mixture was heated to 60° C. and held at the temperature for 2 hours for reaction, then 1.4 g of phthalic anhydride was added thereto and the reaction was continued for further one hour. The reaction mixture was cooled to −28° C. and 56 ml of $TiCl_4$ was added dropwise thereto, then the temperature was increased slowly to 85° C. over 4 hours and maintained for further one hour for reaction. Solid was precipitated gradually during the heating. After removing the mother liquid by suction filtration, the filter cake was washed with toluene and hexane individually twice, then dried to give solid A containing magnesium and titanium. To the reactor containing the solid A were added 100 ml of hexane, and then 1.5 ml of cyclohexanone with string. The mixture was allowed to react at room temperature for one hour, then washed thrice with hexane and dried under vacuum to give 5.2 g of particulate solid component B. The solid component B was found to contain 2.0 percent by weight of titanium, 17.5 percent by weight of magnesium, and 14.5 percent by weight of cyclohexanone.

2. Slurry Polymerization

The catalyst component was evaluated in slurry polymerization process and the polymerization procedure and conditions were same as that described in example 1. The results were showed in Table 4.

EXAMPLE 10

The procedure of example 9 was repeated, except substituting 1.7 ml of 4-methyl-3-penten-2-one for 1.5 ml of cyclohexanone, thereby giving 7.3 g of particulate solid component B, which was found to contain 3.44 percent by weight of titanium, 17.4 percent by weight of magnesium, and 17.8 percent by weight of 4-methyl-3-penten-2-one.

The catalyst component was evaluated in slurry polymerization process and the polymerization procedure and conditions were same as that described in example 1. The results were showed in Table 4.

EXAMPLE 11

The procedure of example 9 was repeated, except substituting 1.5 ml of phenyl ethyl ether for 1.5 ml of cyclohexanone, thereby giving 5.6 g of particulate solid component B, which was found to contain 1.46 percent by weight of titanium, 17.2 percent by weight of magnesium, and 2.22 percent by weight of phenyl ethyl ether.

The catalyst component was evaluated in slurry polymerization process and the polymerization procedure and conditions were same as that described in example 1. The results were showed in Table 4.

EXAMPLE 12

The procedure of example 9 was repeated, except substituting 1.5 ml of di-n-butyl ether for 1.5 ml of cyclohexanone, thereby giving 6.3 g of particulate solid component B, which was found to contain 1.77 percent by weight of titanium, 18.1 percent by weight of magnesium, and 2.71 percent by weight of di-n-butyl ether.

The catalyst component was evaluated in slurry polymerization process and the polymerization procedure and conditions were same as that described in example 1. The results were showed in Table 4.

EXAMPLE 13

The procedure of example 9 was repeated, except substituting 1.5 ml of butanone for 1.5 ml of cyclohexanone, thereby giving 7.3 g of particulate solid component B, which was found to contain 3.38 percent by weight of titanium, 17.7 percent by weight of magnesium, and 15.8 percent by weight of di-n-butyl ether.

The catalyst component was evaluated in slurry polymerization process and the polymerization procedure and conditions were same as that described in example 1. The results were showed in Table 4.

EXAMPLE 14

The procedure of example 9 was repeated, except substituting 1.5 ml of 2,5-hexadione for 1.5 ml of cyclohexanone, thereby giving 7.2 g of particulate solid component B, which was found to contain 1.79 percent by weight of titanium, 17.2 percent by weight of magnesium, and 15.7 percent by weight of 2,5-hexadione.

The catalyst component was evaluated in slurry polymerization process and the polymerization procedure and conditions were same as that described in example 1. The results were showed in Table 4.

EXAMPLE 15

The procedure of example 9 was repeated, except substituting 1.5 ml of tetrahydropyran for 1.5 ml of cyclohexanone, thereby giving 10.5 g of particulate solid component B, which was found to contain 1.79 percent by weight of titanium, 17.6 percent by weight of magnesium, and 13.3 percent by weight of tetrahydropyran.

The catalyst component was evaluated in slurry polymerization process and the polymerization procedure and conditions were same as that described in example 1. The results were showed in Table 4.

EXAMPLE 16

1. Preparation of the Catalyst Component

To a reactor which was completely purged with $N_2$ were added successively 9.6 g of anhydrous magnesium chloride, 50 ml of toluene, 46.8 ml of 2-ethylhexanol. With sting at 450 rpm, the mixture was heated to 110° C. and held at the temperature for 2 hours, then 2.22 g of phthalic anhydride was added thereto and the reaction was continued for further one hour to give a homogeneous solution. With continuous stirring, 50 ml of said homogeneous solution was added slowly to a reactor containing 200 ml of titanium tetrachloride with the temperature of the reactor being maintained at −20° C. during the addition. Upon completing the addition, the reaction mixture was gradually heated to 110° C. over about 3 hours and maintained at that temperature for further 2 hours. Solid was precipitated gradually during the heating. After removing the mother liquid by suction filtration, solid component A was obtained.

To the reactor containing the solid component A was added 200 ml of titanium tetrachloride. The temperature was increased to 110° C. and maintained there for 2 hours. After removing mother liquid, the solid residue was washed thrice with hexane at 60° C., then 90 ml of hexane was added thereto followed by 3.0 ml of THF slowly added, and the reaction was performed for 1 hour. After washing twice with hexane and drying under vacuum, 6.1 g of particulate solid component B containing 1.96 percent by weight of titanium, 17.7 percent by weight of magnesium and 29.9 percent by weight of THF was obtained.

2. Slurry Polymerization

The catalyst component B was evaluated in slurry polymerization process and the polymerization procedure and conditions were same as that described in example 1. The results were showed in Table 4.

EXAMPLE 17

The procedure of example 16 was repeated, except substituting decane for toluene as solvent, thereby giving 6.2 g of particulate solid component B, which was found to contain 1.95 percent by weight of titanium, 17.9 percent by weight of magnesium, and 24.2 percent by weight of THF.

The catalyst component was evaluated in slurry polymerization process and the polymerization procedure and conditions were same as that described in example 1. The results were showed in Table 4.

TABLE 4

Polymerization results

| Example | Activity (gPE/gCat) | Bulk Density (g/cm³) | Content of fine powder less than 150 μm (Wt %) | MI (g/10 min) |
|---|---|---|---|---|
| Example 8 | 6190 | 0.39 | 2.8 | 1.44 |
| Example 9 | 4788 | 0.38 | 3.8 | 1.13 |
| Example 10 | 5397 | 0.33 | 6.4 | 1.28 |
| Example 11 | 4935 | 0.33 | 10.4 | 0.26 |
| Example 12 | 4826 | 0.32 | 11.9 | 0.30 |
| Example 13 | 6548 | 0.29 | 5.1 | 1.32 |
| Example 14 | 3740 | 0.36 | 8.8 | 0.39 |
| Example 15 | 4641 | 0.34 | 4.9 | 0.43 |
| Example 16 | 6871 | 0.34 | 4.2 | 0.75 |
| Example 17 | 5432 | 0.33 | 5.7 | 0.56 |

EXAMPLE 18

1. Preparation of the Catalyst Component

A spherical carrier consisting of the adduct of magnesium chloride and alcohol was prepared according to the method disclosed in EP395083. Partial alcohol was removed by heat treatment at 95° C. so that the molar ratio of alcohol to magnesium chloride was 0.83. To a reactor were added 10 g of the carrier and 90 ml of hexane, and with stirring at 450 rpm, 6 ml of 26.43 percent by volume solution of monochlorodiethylaluminium in hexane and 5 ml of titanium tetrachloride were added at room temperature. The mixture was heated to 60° C. and maintained at that temperature for 2 hours. After removing the mother liquid in the reactor and adding 90 ml of hexane to the reactor, 5 ml of tetrahydrofuran was added dropwise with stirring, and the mixture was allowed to react for one hour at room temperature. After the solid residue had been washed twice with hexane, drying under vacuum gave 10.2 g of spherical solid component B, which was found to contain 1.96 percent by weight of titanium, 17.7 percent by weight of magnesium, and 29.9 percent by weight of tetrahydrofuran.

2. Slurry Polymerization of Ethylene

With stirring, to a 2 liters stainless steel autoclave, which had been well evacuated and replaced with hydrogen, were added about 0.5 liter of hexane by means of nitrogen pressure, 2 ml of 1 mmol/ml solution of $AlEt_3$ in hexane using a syringe and about 30 mg of the above spherical solid component B. Then to the reactor was supplemented hexane to about 1 liter of total amount. Upon completion, the reactor was heated to 85° C., introduced hydrogen to make the fractional pressure of hydrogen in the autoclave be 0.28 MPa, then introduced ethylene gas to make its fractional pressure be 0.75 MPa. The polymerization reaction was continued for 2 hours at constant temperature of 85° C. and ethylene was made up during the polymerization to maintain the fractional pressure of ethylene. Then the temperature of the autoclave was reduced, the pressure was relieved and the polymer slurry was discharged. After removing hexane, the polymer was dried in air under an infrared lamp to give polyethylene powder. The activity of the catalyst was 7053 gPE/gcat., bulk density of the polymer powder was 0.348 g/cm³, the content of fine powder less than 150 μm was 1.1 percent by weight, and melt index of the polymer was 1.47 g/10 min.

What is claimed is:

1. A catalyst component for homopolymerization or co-polymerization of ethylene, comprising at least one electron donor compound supported on a composition containing magnesium and titanium, wherein the electron donor compound is at least one selected from the group consisting of aliphatic ethers having total from 2 to 12 carbon atoms, cyclic ethers having from 3 to 5 carbon atoms, aromatic ethers having total from 7 to 8 carbon atoms, saturated or unsaturated aliphatic ketones having from 3 to 6 carbon atoms, and alicyclic ketones having from 5 to 10 carbon atoms, wherein the composition containing magnesium and titanium is prepared by dissolving a magnesium compound into a solvent system to form a homogeneous solution and then contacting the solution with a titanium compound in the presence of a precipitation aid to precipitate the composition and wherein the solvent system comprises an organic epoxy compound and an organophosphorus compound.

2. A catalyst component according to claim 1, wherein the catalyst component comprises from 5 to 30 percent by weight of magnesium, from 0.1 to 10 percent by weight of titanium, from 15 to 65 percent by weight of halogen, and from 1 to 60 percent by weight of electron donor, based on the total weight of the solid catalyst component.

3. A catalyst component according to claim 1, wherein the titanium compound has a general formula $Ti(OR)_aX_b$, in which R is $C_1$–$C_{14}$ aliphatic hydrocarbyl or aromatic hydrocarbyl, X is halogen, a is 0, 1 or 2, b is an integer of from 1 to 4, and the sum of a+b is 3 or 4.

4. A catalyst component according to claim 1, wherein the magnesium compound is selected from the group consisting of magnesium dihalides, hydrates or alcohol adducts of magnesium dihalide, derivatives formed by replacing one halogen atom of magnesium dihalide with hydrocarbyloxy group or halo-hydrocarbyloxy group, and their mixture.

5. A catalyst component according to claim 1, wherein the organic epoxy compound comprises at least one selected from the group consisting of oxides of aliphatic olefin, diene or halogenated aliphatic olefin or diene, glycidyl ethers and cyclic ethers having from 2 to 8 carbon atoms.

6. A catalyst component according to claim 1, wherein the organophosphorus compound is at least one selected from the group consisting of hydrocarbyl esters or halohydrocarbyl esters of ortho-phosphoric acid and phosphorous acid.

7. A catalyst component according to claim 1, wherein the solvent system comprises a branched aliphatic alcohol compound.

8. A catalyst component according to claim 7, wherein the solvent system comprises 2-ethylhexanol.

9. A catalyst component according to claim 1, wherein the precipitation aid is at least one selected from the group consisting of organic carboxylic anhydrides, organic carboxylic acids, ethers and ketones.

10. A catalyst component according to claim 1, wherein the precipitation aid is at least one selected from the group consisting of acetic anhydride, phthalic anhydride, succinic anhydride, maleic anhydride, 1,2,4,5-benzene tetracarboxylic acid dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether and dipentyl ether.

11. A catalyst component according to claim 1, wherein the electron donor compound is selected from the group consisting of diethyl ether, di-n-butyl ether, dihexyl ether, ethyl phenyl ether, tetrahydrofuran, acetone, butanone, isobutyl methyl ketone, 4-methyl-3-penten-2-one, hexadione, cyclohexanone and any combinations of any above compounds.

12. A catalyst component according to claim 1, wherein the electron donor compound is a cyclic ether having from 3 to 5 carbon atoms.

13. A catalyst component according to claim 12, wherein the electron donor compound is tetrahydrofuran.

14. A catalyst component according to claim 1, wherein it further comprises at least one activator having a general formula $AlR'_cX'_dH_e$, in which R' is saturated hydrocarbyl having 1 to 14 carbon atoms, X' is a halogen, d is 1 or 2, e is 0 or 1, and the sum of c+d+e is 3.

15. A catalyst component according to claim 14, wherein the activator is one or more selected from the group consisting of $AlEt_3$, $Al(n-Bu)_3$, $Al(n-C_6H_{13})3$, $Al(i-Bu)_3$, $AlEt_2Cl$, $Al(n-C_8H_{17})_3$, and $AlEt_2H$.

16. A method for the preparation of the catalyst component as claimed in claim 1, comprising the steps of:

dissolving the magnesium compound into the solvent system containing an organic epoxy compound and an organophosphorus compound to form a homogeneous solution;

contacting the solution with the titanium compound in the presence of the precipitation aid to precipitate a solid;

treating the obtained solid with the electron donor compound and, optionally, the titanium compound to obtain a resultant product; and optionally, activating the resultant product with an activator.

17. A method according to claim 16, wherein individual raw material is used in the amount of from 0.2 to 10 mole for the organic epoxy compound, from 0.1 to 3 mole for the organophosphorus compound, from 0.03 to 1.0 mole for the precipitation aid, from 0.5 to 150 mole for the total titanium compound, from 0.01 to 10 mole for the electron donor compound, and from 0.1 to 10 mole for the activator, based on per mole magnesium compound.

18. A catalyst for homopolymerization or co-polymerization of ethylene, comprising the reaction product of the following two components:

(a) catalyst component according to claim 1; and (b) organoaluminum as cocatalyst component.

19. A method for homopolymerization of ethylene or co-polymerization of ethylene with at least one $C_3$–$C_8$ α-olefin, comprising contacting ethylene or ethylene and at least one C3–C8 α-olefin with the catalyst according to claim 18 under polymerization conditions.

20. A method for homopolymerization of ethylene or co-polymerization of ethylene with at least one C3–C8 α-olefin, comprising contacting ethylene or ethylene and at least one C3–C8 α-olefin with the catalyst according to claim 18 under polymerization conditions in sluny or gas phase process.

21. A catalyst for homopolymerization or co-polymerization of ethylene, comprising the reaction product of the following two components:

(a) catalyst component according to claim 2; and (b) organoaluminum as cocatalyst component.

22. A method for homopolymerization of ethylene or co-polymerization of ethylene with at least one C3–C8 α-olefin, comprising contacting ethylene or ethylene and at least one C3–C8 α-olefin with the catalyst according to claim 21 under polymerization conditions.

23. A method for homopolymerization of ethylene or co-polymerization of ethylene with at least one C3–C8 α-olefin, comprising contacting ethylene or ethylene and at least one C3–C8 α-olefin with the catalyst according to claim 21 under polymerization conditions in slurry or gas phase process.

* * * * *